US010433254B2

(12) United States Patent
Sirotkin et al.

(10) Patent No.: US 10,433,254 B2
(45) Date of Patent: *Oct. 1, 2019

(54) METHOD, SYSTEM AND APPARATUS OF TIME-DIVISION-DUPLEX (TDD) UPLINK-DOWNLINK (UL-DL) CONFIGURATION MANAGEMENT

(71) Applicant: INTEL CORPORATION, Santa Clara, CA (US)

(72) Inventors: Alexander Sirotkin, Giv'on Hachadasha (IL); Alexey Khoryaev, Nizhny Novgorod (RU); Andrey Chervyakov, Nizhny Novgorod (RU); Mikhail S. Shilov, Nizhny Novgorod (RU); Sergey Panteleev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,189

(22) Filed: Jun. 5, 2017

(65) Prior Publication Data
US 2018/0063792 A1 Mar. 1, 2018

Related U.S. Application Data

(63) Continuation of application No. 14/532,570, filed on Nov. 4, 2014, now Pat. No. 9,673,928, which is a
(Continued)

(51) Int. Cl.
*H04W 36/00* (2009.01)
*H04W 52/02* (2009.01)
(Continued)

(52) U.S. Cl.
CPC .......... *H04W 52/0235* (2013.01); *H04B 1/56* (2013.01); *H04B 7/024* (2013.01); *H04B 7/0417* (2013.01); *H04B 7/0456* (2013.01); *H04B 7/0473* (2013.01); *H04B 7/0486* (2013.01); *H04B 7/063* (2013.01); *H04B 7/065* (2013.01);
(Continued)

(58) Field of Classification Search
None
See application file for complete search history.

(56) References Cited

U.S. PATENT DOCUMENTS 9,673,928 B2 * 6/2017 Sirotkin .............. H04W 4/90
2011/0122851 A1 5/2011 Gessner et al.

OTHER PUBLICATIONS

Office Action received for Japanese Patent Application No. JP2016164639, dated Sep. 28, 2017, 10 pages including 6 pages English translation.
(Continued)

*Primary Examiner* — Anh Ngoc M Nguyen (57) ABSTRACT

Some demonstrative embodiments include devices, systems and/or methods of Time-Division Duplexing (TDD) Uplink-Downlink (UL-DL) configuration management. For example, a node may communicate a message including a cell identifier identifying a first cell controlled by the node, and a TDD configuration update to update at least one other node, which controls at least one second cell, with a TDD UL-DL configuration allocated by the node for communication within the first cell.

27 Claims, 3 Drawing Sheets

Related U.S. Application Data continuation of application No. 13/681,508, filed on Nov. 20, 2012, now Pat. No. 8,982,741.

(60) Provisional application No. 61/646,223, filed on May 11, 2012.

(51) Int. Cl.

| | | |
|---|---|---|
| *H04B 7/26* | (2006.01) | |
| *H04W 76/14* | (2018.01) | |
| *H04W 4/90* | (2018.01) | |
| *H04J 3/16* | (2006.01) | |
| *H04W 24/10* | (2009.01) | |
| *H04W 72/04* | (2009.01) | |
| *H04W 72/08* | (2009.01) | |
| *H04J 3/00* | (2006.01) | |
| *H04B 1/56* | (2006.01) | |
| *H04W 56/00* | (2009.01) | |
| *H04W 88/06* | (2009.01) | |
| *H04W 36/22* | (2009.01) | |
| *H04B 15/00* | (2006.01) | |
| *H04B 7/024* | (2017.01) | |
| *H04B 7/0456* | (2017.01) | |
| *H04B 7/06* | (2006.01) | |
| *H04W 24/02* | (2009.01) | |
| *H04W 72/12* | (2009.01) | |
| *H04L 29/02* | (2006.01) | |
| *H04W 4/06* | (2009.01) | |
| *H04W 48/20* | (2009.01) | |
| *H04W 16/14* | (2009.01) | |
| *H04L 29/06* | (2006.01) | |
| *H04W 4/02* | (2018.01) | |
| *H04J 3/26* | (2006.01) | |
| *H04L 27/26* | (2006.01) | |
| *H04W 72/10* | (2009.01) | |
| *H04L 5/00* | (2006.01) | |
| *H04L 5/14* | (2006.01) | |
| *H04W 36/32* | (2009.01) | |
| *H04W 4/16* | (2009.01) | |
| *H04W 36/04* | (2009.01) | |
| *H04W 36/16* | (2009.01) | |
| *H04W 72/00* | (2009.01) | |
| *H04B 7/0417* | (2017.01) | |
| *H04W 4/70* | (2018.01) | |
| *H04W 76/18* | (2018.01) | |
| *H04W 76/28* | (2018.01) | |
| *H04W 76/27* | (2018.01) | |
| *H04L 29/08* | (2006.01) | |
| *H04W 36/30* | (2009.01) | |
| *H04W 36/18* | (2009.01) | |
| *H04W 72/02* | (2009.01) | |
| *H04L 1/00* | (2006.01) | |
| *H04L 1/18* | (2006.01) | |
| *H04W 88/02* | (2009.01) | |
| *H04W 88/08* | (2009.01) | |

(52) U.S. Cl.
CPC ......... *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/1694* (2013.01); *H04J 3/26* (2013.01); *H04L 5/001* (2013.01); *H04L 5/0007* (2013.01); *H04L 5/0035* (2013.01); *H04L 5/0096* (2013.01); *H04L 5/14* (2013.01); *H04L 5/1469* (2013.01); *H04L 27/2627* (2013.01); *H04L 29/02* (2013.01); *H04L 69/22* (2013.01); *H04L 69/324* (2013.01); *H04W 4/023* (2013.01); *H04W 4/06* (2013.01); *H04W 4/16* (2013.01); *H04W 4/70* (2018.02); *H04W 4/90* (2018.02); *H04W 16/14* (2013.01); *H04W 24/02* (2013.01); *H04W 24/10* (2013.01); *H04W 36/00* (2013.01); *H04W 36/0055* (2013.01); *H04W 36/0061* (2013.01); *H04W 36/0088* (2013.01); *H04W 36/0094* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0209* (2013.01); *H04W 52/0212* (2013.01); *H04W 52/0216* (2013.01); *H04W 52/0225* (2013.01); *H04W 52/0229* (2013.01); *H04W 52/0251* (2013.01); *H04W 56/00* (2013.01); *H04W 56/001* (2013.01); *H04W 72/005* (2013.01); *H04W 72/042* (2013.01); *H04W 72/044* (2013.01); *H04W 72/048* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/12* (2013.01); *H04W 72/1215* (2013.01); *H04W 76/14* (2018.02); *H04W 76/18* (2018.02); *H04W 76/27* (2018.02); *H04W 76/28* (2018.02); *H04W 88/06* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04W 4/02* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/08* (2013.01); *Y02D 70/00* (2018.01); *Y02D 70/1222* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/24* (2018.01); *Y02D 70/40* (2018.01); *Y02D 70/442* (2018.01); *Y02D 70/444* (2018.01)

(56) References Cited

OTHER PUBLICATIONS

Alcatel-Lucent, Alcatel-Lucent Shanghai Bell, "TDD DL-UL Reconfiguration Study Item", 3GPP TSG-RAN-WG4 Meeting #60 R4-114063, Aug. 20, 2011.

Nokia Corporation, Nokia Siemens Networks, "Discussion on Methods to support different time scales for TDD UL-DL reconfiguration", 3GPP TSG-RAN WG1 Meeting #69 R1-122435, 2012.

* cited by examiner

METHOD, SYSTEM AND APPARATUS OF TIME-DIVISION-DUPLEX (TDD) UPLINK-DOWNLINK (UL-DL) CONFIGURATION MANAGEMENT

CROSS REFERENCE

This application is a continuation of, claims the benefit of and priority to previously filed U.S. patent application Ser. No. 14/532,570 entitled "METHOD, SYSTEM AND APPARATUS OF TIME-DIVISION-DUPLEX (TDD) UPLINK-DOWNLINK (UL-DL) CONFIGURATION MANAGEMENT" filed Nov. 4, 2014, which is a continuation of U.S. patent application Ser. No. 13/681,508 filed Nov. 20, 2012, which claims the benefit of and priority to U.S. Provisional Patent Application No. 61/646,223 entitled "Advanced Wireless Communication Systems and Techniques", filed May 11, 2012. All of the above are incorporated herein by reference in their entirety.

BACKGROUND

Traffic communicated in a communication network, e.g., a cellular network, may often be asymmetrical in time or cell domains. For instance, the amount of Downlink (DL) and Uplink (UL) traffic may be significantly different and may vary in time and/or across different cells. Such traffic variation may be handled effectively, for example, by adapting the amount of time resources assigned to the DL and the UL, e.g. using different Time Division Duplexing (TDD) frame configurations.

TDD offers flexible deployments without requiring a pair of spectrum resources. For TDD deployments in general, interference between UL and DL including both Base Station (BS) to BS and User Equipment (UE) to UE interference needs to be considered. One example includes layered heterogeneous network deployments, where it may be of interest to consider different uplink-downlink configurations in different cells. Also of interest are deployments involving different carriers deployed by different operators in the same band and employing either the same or different uplink-downlink configurations, where possible interference may include adjacent channel interference as well as co-channel interference such as remote BS-to-BS interference.

Currently, Long-Term-Evolution (LTE) TDD allows for asymmetric UL-DL allocations by providing a semi-static allocation utilizing seven different semi-statically configured uplink-downlink configurations. The semi-static allocation may or may not match the actual instantaneous traffic situation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multistandard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications, e.g., 3 *GPP TS* 36.423: *Evolved Universal Terrestrial Radio Access Network (E-UTRAN); X2 Application Protocol (X2AP)* ("RAN 3"), 3*GPP TS* 36.201: *"Evolved Universal Terrestrial Radio Access (E-UTRA); Physical Layer—General Description"* ("RAN 1"), and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1xRTT), Evolution-Data Optimized (EV-DO), Enhanced Data rates for GSM Evolution (EDGE), and the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node ("also referred to as a "base station"), or the like. The linking between a carrier frequency of the downlink resources and a carrier frequency of the uplink resources may be indicated in system information transmitted on the downlink resources.

Figure 1:
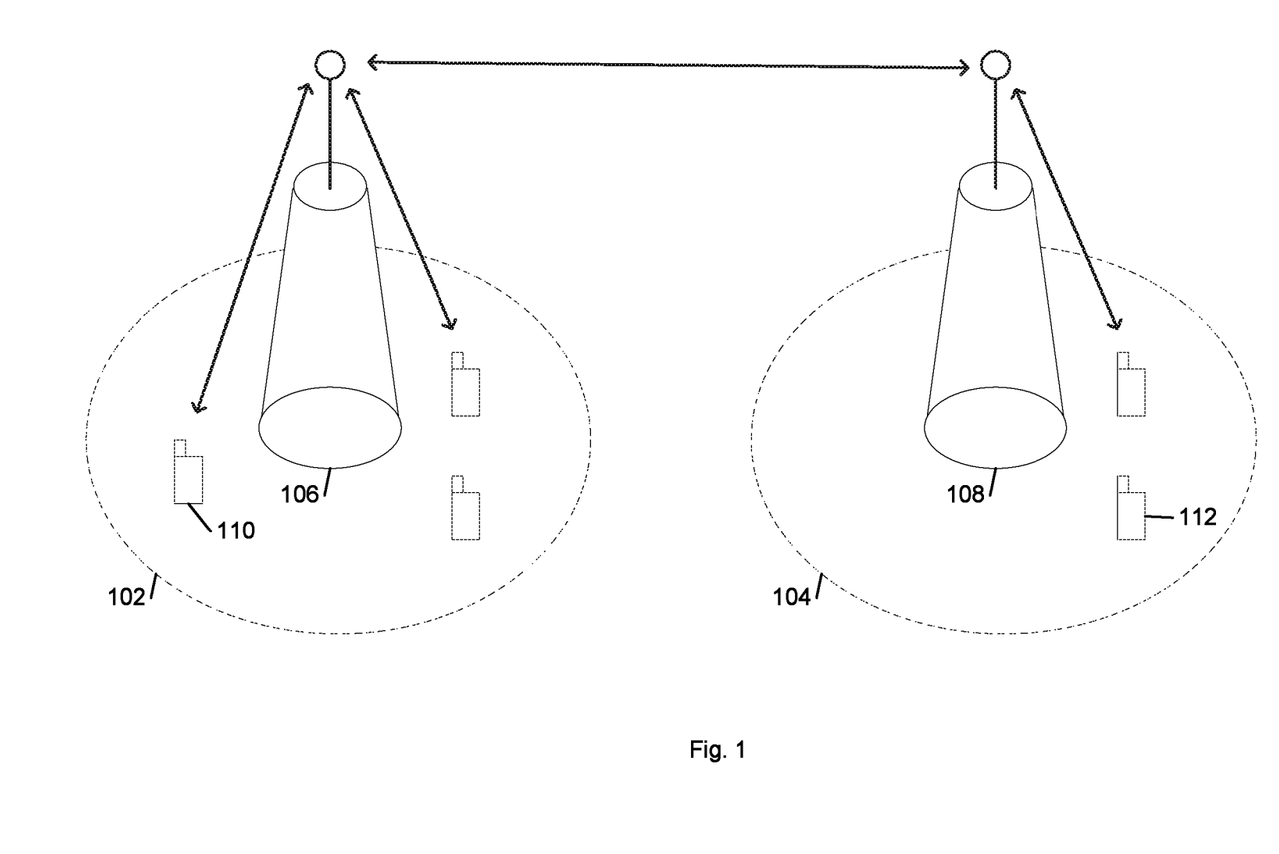
FIG. 1 is a schematic block diagram illustration of a cellular system, in accordance with some demonstrative embodiments.

Reference is now made to FIG. 1, which schematically illustrates a block diagram of a cellular system 100, in accordance with some demonstrative embodiments. For example, cellular system 100 may include a $4^{th}$ generation cellular system such as, for example, a WiMAX cellular system, a long term evolution (LTE) or LTE advance cellular system, and the like.

As shown in FIG. 1, in some demonstrative embodiments, system 100 may include a plurality of cellular nodes, e.g., including cellular nodes 106 and 108, capable of communicating content, data, information and/or signals corresponding to a plurality of cells, e.g., including cells 102 and 104. For example, node 106 may communicate with a plurality of User Equipment (UE) devices 110 within cell 102 and/or node 108 may communicate with a plurality of UE devices 112 within cell 104.

In some demonstrative embodiments, nodes 106 and/or 108 may include an Evolved Node B (eNB). For example, nodes 106 and/or 108 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, nodes 106 and/or 108 may include any other functionality and/or may perform the functionality of any other cellular node, e.g., a Node B (NB).

In some demonstrative embodiments, UEs 110 and/or 112 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

Figure 2:
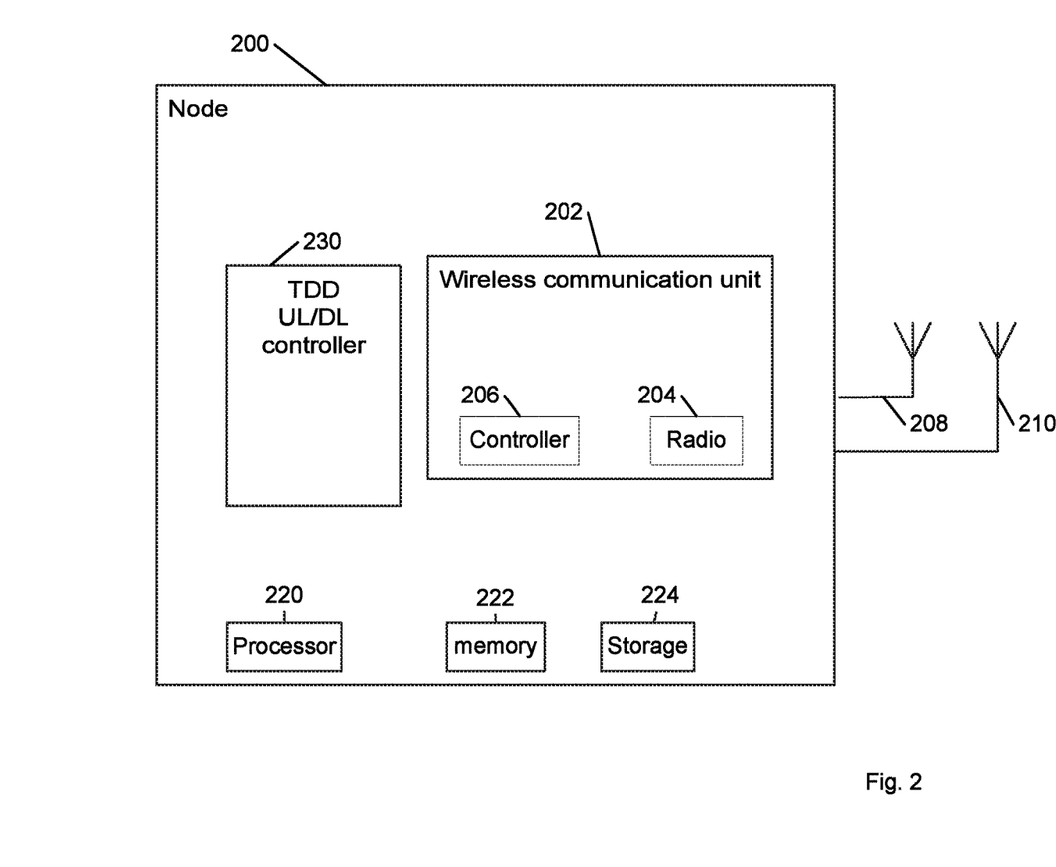
FIG. 2 is a schematic block diagram illustration of a cellular node, in accordance with some demonstrative embodiments.

Reference is made to FIG. 2, which schematically illustrates a cellular node 200, in accordance with some demonstrative embodiments. For example, cellular node 200 may perform the functionality of node 106 (FIG. 1) and/or node 108 (FIG. 1).

In some demonstrative embodiments, cellular node 200 may include one or more wireless communication units 202 to perform wireless communication between node 200 and one or more other devices, e.g., one or more other cellular nodes, UEs, and the like.

In some demonstrative embodiments, wireless communication unit 202 may include, or may be associated with, one or more antennas. In one example, wireless communication unit 202 may be associated with at least two antennas, e.g., antennas 208 and 210.

In some demonstrative embodiments, antennas 208 and/or 210 may include any type of antennas suitable for transmitting and/or receiving wireless communication signals, blocks, frames, transmission streams, packets, messages and/or data. For example, antennas 208 and/or 210 may include any suitable configuration, structure and/or arrangement of one or more antenna elements, components, units, assemblies and/or arrays. For example, antennas 208 and/or 210 may include a phased array antenna, a dipole antenna, a single element antenna, a set of switched beam antennas, and/or the like.

In some embodiments, antennas 208 and/or 210 may implement transmit and receive functionalities using separate transmit and receive antenna elements. In some embodiments, antennas 208 and/or 210 may implement transmit and receive functionalities using common and/or integrated transmit/receive elements.

In some demonstrative embodiments, wireless communication unit 202 may include, for example, at least one radio 204 and at least one controller 206 to control communications performed by radio 204. For example, radio 204 may include one or more wireless transmitters, receivers and/or transceivers able to send and/or receive wireless communication signals, RF signals, frames, blocks, transmission streams, packets, messages, data items, and/or data.

In some demonstrative embodiments, radio 204 may include a multiple input multiple output (MIMO) transmitters receivers system (not shown), which may be capable of performing antenna beamforming methods, if desired.

In some demonstrative embodiments, radio 204 may include a turbo decoder and/or a turbo encoder (not shown) for encoding and/or decoding data bits into data symbols, if desired.

In some demonstrative embodiments, radio 204 may include OFDM and/or SC-FDMA modulators and/or demodulators (not shown) configured to communicate OFDM signals over downlink (DL) channels, e.g., between cellular node 200 and a UE, and SC-FDMA signals over uplink (UL) channels, e.g., between the UE and cellular node 200.

In some demonstrative embodiments, node 200 may include a Time-Division-Duplexing (TDD) UL-DL configuration controller 230 to control a TDD UL-DL configuration of time resources allocated for the UL and DL communication within a cell controlled by node 200. For example, node 106 (FIG. 1) may include a TDD UL-DL configuration controller 230 to control a TDD UL-DL configuration of time resources allocated for the UL and DL communication within cell 102 (FIG. 1); and/or node 108 (FIG. 1) may include a TDD UL-DL configuration controller 230 to control a TDD UL-DL configuration of time resources allocated for the UL and DL communication within cell 104 (FIG. 1).

In some demonstrative embodiments, TDD UL-DL configuration controller 230 may be implemented as part of wireless communication unit 202. In other embodiments, TDD UL-DL configuration controller 230 and wireless communication unit 202 may be implemented as separate elements of node 200 or as a separate network entity that controls dynamic assignment of UL-DL configuration for multiple cells.

In some demonstrative embodiments, cellular node 200 may include, for example, one or more of a processor 220, a memory unit 222, and a storage unit 224. In one example, one or more of processor, 220 memory 222 and/or storage 224 may be implemented as one or more elements separate from wireless communication unit 202 and/or TDD UL/DL configuration controller 230. In another example, one or more of processor, 220 memory 222 and/or storage 224 may be implemented as part of wireless communication unit 202 and/or TDD UL/DL configuration controller 230.

Processor 220 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 220 executes instructions, for example, of an Operating System (OS) of node 200 and/or of one or more suitable applications.

Memory unit 222 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by node 200.

Referring back to FIG. 1, in some demonstrative embodiments nodes 106 and 108 may be configured to perform TDD UL-DL configuration management, e.g., as described in detail below.

In some demonstrative embodiments, nodes 106 and 108 may communicate TDD UL-DL configuration information. For example, node 106 may transmit to node 108 TDD UL-DL configuration information relating to a TDD UL-DL configuration of cell 102; and/or node 108 may transmit to node 106 TDD UL-DL configuration information relating to a TDD UL-DL configuration of cell 104, e.g., as described below. In other embodiments the TDD UL-DL configuration information may be shared with another network entity, which may define a TDD UL-DL configuration to be used at nodes 106 and 108.

Some demonstrative embodiments are described herein with reference to an eNB-to-eNB interface for communicating TDD UL-DL configuration information between two eNBs. However, other embodiments may be implemented with respect to any other interface, e.g., an eNB-to-OAM interface for communicating the TDD UL-DL configuration information between an eNB and a Operations and Management (OAM) interface between the eNB and an Element Management System (EMS), e.g., a Mobility Management Entity (MME), and the like.

In some demonstrative embodiments, nodes 106 and 108 may utilize the TDD UL-DL configuration information, for example, for enhanced Interference Management and Traffic Adaptation (eIMTA), and/or for any other purpose.

In some demonstrative embodiments, nodes 106 and 108 may utilize the TDD UL-DL configuration information, for example, for dynamic TDD UL-DL configuration. For example, a first node, e.g., node 106, may communicate to a second node, e.g., node 108, TDD UL-DL configuration information relating to the TDD UL-DL configuration of a cell controlled by the first node, e.g., cell 102. The second node, e.g., node 108, may adapt, e.g., dynamically adapt, a TDD UL-DL configuration of a cell controlled by the second node, e.g., cell 104, based at least on the TDD UL-DL of the first cell. For example, node 108 may dynamically adapt a TDD UL-DL configuration of cell 104 by dynamically taking into account uplink and downlink traffic and other conditions of cell 102.

In some demonstrative embodiments, node 106 may transmit a message including a TDD UL-DL configuration update to update at least one other node, e.g., node 108, with a TDD UL-DL configuration allocated by node 106, e.g., by the TDD UL-DL configuration controller 230 (FIG. 1) of node 106, for communication within cell 102, e.g., as described in detail below.

In some demonstrative embodiments, node 108 may receive the message from node 106 and may allocate a TDD UL-DL configuration for communication within cell 104 based on the TDD UL-DL configuration update received from node 106. For example, the TDD UL-DL configuration controller 230 (FIG. 1) of node 108 may allocate the TDD UL-DL configuration for communication within cell 104 based on the TDD UL-DL configuration update received from node 106.

In some demonstrative embodiments, the message may include an X2 Application Protocol (X2AP) message, which may be configured for communication between eNBs. In other embodiments, the message may include any other message configured for communication between any other cellular nodes.

In some demonstrative embodiments, the TDD UL-DL configuration update may be communicated as part of a dedicated field of X2AP message, e.g., an existing message type, which may include other fields for other predefined purposes.

In some demonstrative embodiments, the TDD UL-DL configuration update may be communicated as part of a dedicated X2AP message, e.g., a new message type, which may be dedicated for communicating the TDD UL-DL configuration update.

In some demonstrative embodiments, communicating the TDD UL-DL configuration update as part of an existing message type may be beneficial, e.g., as having a reduced standardization impact.

In some demonstrative embodiments, communicating the TDD UL-DL configuration update as part of a dedicated message may enable providing the TDD UL-DL configuration update at a timing and/or frequency, which may be independent from and/or different from a timing of communicating the existing message. For example, communicating the TDD UL-DL configuration update as part of a dedicated message may enable providing the TDD UL-DL update at a frequency, which may higher than a frequency of a resource status update, e.g., a frequency of less than one second.

In some demonstrative embodiments, the message may also include a cell identifier identifying the cell corresponding to the TDD UL-DL configuration update. For example, node 106 may transmit a message including an identifier of cell 102 and the TDD UL-DL information corresponding to cell 102.

In some demonstrative embodiments, the TDD UL-DL configuration update may be included as part of a predefined Information Element (IE) ("Dynamic Subframe Assignment IE").

In some demonstrative embodiments, the TDD UL-DL configuration update may be included as part of a message defined for communicating load and interference coordination information.

For example, the TDD UL-DL configuration update may be included as part of a Load Information X2AP message, which may be communicated from an eNB, e.g., node 106, to one or more neighboring eNBs, e.g., including eNB 108.

In one example, the Dynamic Subframe Assignment IE may be included as part of the Load Information X2AP message, e.g., as follows:

TABLE 1

| IE/Group Name | Presence | Range | IE type and reference | Semantics description | Criticality | Assigned Criticality |
|---|---|---|---|---|---|---|
| Message Type | Mandatory (M) | | 9.2.13 | | YES | ignore |
| Cell Information | M | | | | YES | ignore |
| >Cell Information Item | | 1 . . . <maxCellineNB> | | | EACH | ignore |
| >>Cell ID | M | | ECGI 9.2.14 | Id of the source cell | — | — |
| >>UL Interference Overload Indication | Optional (O) | | 9.2.17 | | — | — |
| >>UL High Interference Information | | 0 . . . <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |

TABLE 1-continued

| IE/Group Name | Presence | Range | IE type and reference | Semantics description | Criticality | Assigned Criticality |
|---|---|---|---|---|---|---|
| >>Dynamic Subframe Assignment | O | | ENUMERATED (sa0, sa1, sa2, sa3, sa4, sa5, sa6, . . . ) | Dynamic Uplink-downlink subframe configuration information defined in ref. TS 36.211 [10] to support adaptive change of UL-DL configuration w/o system information update | — | — |

The notation ENUMERATED (sa0, sa1, sa2, sa3, sa4, sa5, sa6 . . . ), as used in Table 1, denotes that the Dynamic Subframe Assignment IE may include one of the values denoted "sa". The values denoted "sa" may include values indicating different TDD UL-DL configurations. For example, the values sa0, sa1, sa2, sa3, sa4, sa5, sa6 may indicate seven respective predefined TDD UL-DL configurations. In one embodiment, the seven predefined TDD UL-DL configurations may include, for example, TDD UL-DL configurations defined by the LTE Specifications, e.g., as defined by 3GPP TS 36.211 ("*Evolved Universal Terrestrial Radio Access (E-UTRA); Physical channels and modulations*"). For example, the value sa0 may represent a first predefined allocation of time resources, the value sa1 may represent a second predefined allocation of time resources, and so on. In other embodiments, the Dynamic Subframe Assignment IE may include any other representation of a TDD UL-DL configuration, e.g., selected from any other predefined set of TDD UL-DL configurations and/or defined in any other suitable manner, e.g., with or without referring to one or more predefined configurations.

Per Table 1, the Load Information X2AP message may include a "Cell ID" IE including a cell identifier identifying the cell to which the Dynamic Subframe Assignment IE corresponds, and a target cell identifier, denoted "Target Cell ID", identifying a cell of a node intended to receive the Dynamic Subframe Assignment IE.

In some demonstrative embodiments, the TDD UL-DL configuration update may be included as part of a message broadcast by an eNB and including a configuration update corresponding to the eNB.

For example, the TDD UL-DL configuration update may be included as part of a Configuration Update X2AP message, which may be communicated from an eNB, e.g., node 106, to one or more neighboring eNBs, e.g., including eNB 108.

In one example, the Dynamic Subframe Assignment IE may be included as part of a Served Cell Information IE of the Configuration Update X2AP message, e.g., as follows:

TABLE 2

| IE/Group Name | Presence | Range | IE type and reference | Semantics description | Criticality | Assigned Criticality |
|---|---|---|---|---|---|---|
| PCI | M | | INTEGER (0 . . . 503, . . . ) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 . . . <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | | |
| >>>UL EARFCN | M | | EARFCN 9.2.26 | Corresponds to $N_{UL}$ in ref. TS 36.104 [16]. | — | — |
| >>>DL EARFCN | M | | EARFCN 9.2.26 | Corresponds to $N_{DL}$ in ref. TS 36.104 [16]. | — | — |
| >>>UL Transmission Bandwidth | M | | Transmission Bandwidth 9.2 27 | | — | — |
| >>>DL Transmission Bandwidth | M | | Transmission Bandwidth 9.2 27 | Same as UL Transmission Bandwidth in this release. | — | — |

TABLE 2-continued

| IE/Group Name | Presence | Range | IE type and reference | Semantics description | Criticality | Assigned Criticality |
|---|---|---|---|---|---|---|
| >TDD | | | | | — | — |
| >>TDD Info | | 1 | | | — | — |
| >>>EARFCN | M | | 9.2.26 | Corresponds to $N_{DL}/N_{UL}$ in ref. TS 36.104 [16]. | — | — |
| >>>Transmission Bandwidth | M | | Transmission Bandwidth 9.2 27 | | — | — |
| >>>Subframe Assignment | M | | ENUMERATED (sa0, sa1, sa2, sa3, sa4, sa5, sa6, . . . ) | Uplink-downlink subframe configuration information defined in ref. TS 36.211 [10]. | — | — |
| >>>Special Subframe Info | | 1 | | Special subframe configuration information defined in ref. TS 36.211 [10]. | — | — |
| >>>>Special Subframe Patterns | M | | ENUMERATED (ssp0, ssp1, ssp2, ssp3, ssp4, ssp5, ssp6, ssp7, ssp8, . . . ) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| >>>Dynamic Subframe Assignment | O | | ENUMERATED (sa0, sa1, sa2, sa3, sa4, sa5, sa6, . . . ) | Dynamic Uplink-downlink subframe configuration information defined in ref. TS 36.211 [10] to support adaptive change of UL-DL configuration w/o system information update | — | — |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9]. | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG Id | O | | 9.2.53 | | YES | ignore |

In some demonstrative embodiments, the TDD UL-DL configuration update may be included as part of a dedicated message defined for communicating the Dynamic Subframe Assignment IE.

In one example, the Dynamic Subframe Assignment IE may be included as part of a dedicated TDD configuration update X2AP message, e.g., as follows:

TABLE 3

| IE/Group Name | Presence | Range | IE type and reference | Semantics description | Criticality | Assigned Criticality |
|---|---|---|---|---|---|---|
| Message Type | M | | | | YES | ignore |
| Cell Information | M | | | | YES | ignore |
| >Cell Information Item | | 1 ... <maxCellineNB> | | | EACH | ignore |
| >>Cell ID | M | | ECGI 9.2.14 | Id of the source cell | — | — |
| >>Subframe Assignment | O | | ENUMERATED (sa0, sa1, sa2, sa3, sa4, sa5, sa6, ... ) | Uplink-downlink subframe configuration information defined in ref. TS 36.211 [10]. | — | — |

In some demonstrative embodiments, nodes 106 and 108 may communicate one or more additional messages to facilitate dynamic assignment of UL and DL resources and/or to communicate additional information related to the TDD UL-DL configuration utilized by nodes 106 and/or 108 with respect to cells 102 and/or 104, e.g., as described in detail below.

In some demonstrative embodiments, a node, e.g., node 106, may transmit to one or more other nodes, e.g., including node 108, a status report relating to UL and/or DL queue states of one or more cells controlled by the node, e.g., as described below.

In some demonstrative embodiments, the UL-DL queue states may include one or more parameters characterizing current cell demands for required UL and/or DL resources. In one example, the status report may include an estimated number of bits representing an estimated buffer size for UL and/or DL transmission.

In some demonstrative embodiments, nodes 106 and 108 may communicate a status report of UL-DL queue states corresponding to cells 102 and/or 104, e.g., as described below.

In some demonstrative embodiments, a node, e.g., node 106, may receive a status request message indicating a request from another node ("target node"), e.g., node 108, to the node for a status report of UL-DL queue states corresponding to at least one cell controlled by the node, e.g., cell 102. The node may transmit a status update message including the requested report, e.g., in response to the status request message.

In some demonstrative embodiments, the status request message and the status update message may be communicated as part of an X2AP resource status reporting procedure.

In some demonstrative embodiments, the status request message may include a Resource Status Request message including a Report Characteristics IE including a bit, which has a predefined value indicating the request for the status report, and a Reporting Periodicity IE defining a requested periodicity, e.g., a minimal periodicity, at which the node is to transmit the status report to the target node.

For example, the Resource Status Request message may include the Report Characteristics IE, including a sixth bit to indicate whether the status report is requested, and the Reporting Periodicity IE to indicate the requested periodicity, e.g., as follows:

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Measurement ID | M | | INTEGER (1 ... 4095, ... ) | Allocated by eNB$_1$ | YES | reject |
| eNB2 Measurement ID | C-ifRegistrationRequestStop | | INTEGER (1..4095, ... ) | Allocated by eNB$_2$ | YES | ignore |
| Registration Request | M | | ENUMERATED (start, stop, ... ) | A value set to "stop", indicates a request to stop all cells measurements. | YES | reject |
| Report Characteristics | O | | BITSTRING (SIZE(32)) | Each position in the bitmap indicates measurement object the eNB$_2$ is requested to report. First Bit = PRB Periodic, Second Bit = TNL load Ind Periodic, Third Bit = HW | YES | reject |

TABLE 4-continued

| IE/Group Name | Presence | Range | IE type and reference | Semantics description | Criticality | Assigned Criticality |
|---|---|---|---|---|---|---|
| | | | | Load Ind Periodic, Fourth Bit = Composite Available Capacity Periodic, Fifth Bit = ABS Status Periodic. Sixth Bit = UL-DL queue sizes periodic. Other bits shall be ignored by the $eNB_2$ | | |
| Cell To Report | | 1 | | Cell ID list for which measurement is needed | YES | ignore |
| >Cell To Report Item | | 1 ... <maxCellineNB> | | | EACH | ignore |
| >>Cell ID | M | | ECGI 9.2.14 | | — | — |
| Reporting Periodicity | O | | ENUMERATED (10 ms, 20 ms, 40 ms, 80 ms, 160 ms, 320 ms, 640 ms, 1000 ms, 2000 ms, 5000 ms, 10000 ms, ...) | | YES | ignore |
| Partial Success Indicator | O | | ENUMERATED (partial success allowed, ...) | Included if partial success is allowed. | YES | ignore |

For example, the "UL-DL queue sizes periodic" bit may be set to a predefined value, e.g., 1, to indicate that a RESOURCE STATUS UPDATE message is to include the UL-DL queue state information, and is to be transmitted from the target node at a periodicity indicated at the Reporting Periodicity IE, e.g., as defined below.

In some demonstrative embodiments, the status update message may include a Resource Status Update message including an UL/DL queue state IE including an UL queue state and a DL queue state.

For example, the Resource Status Update message may include an UL/DL queue size IE an UL queue state and a DL queue state, e.g., as follows:

TABLE 5

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by $eNB_1$ | YES | reject |
| eNB2 Measurement ID | M | | INTEGER (1 ... 4095, ...) | Allocated by $eNB_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |

TABLE 5-continued

| IE/Group Name | Presence | Range | IE type and reference | Semantics description | Criticality | Assigned Criticality |
|---|---|---|---|---|---|---|
| >>ABS Status | O | | 9.2.58 | | YES | ignore |
| >>UL-DL Queue Sizes | O | | | | | |

The UL-DL Queue Sizes IE may indicate an estimated buffer size to be transmitted in DL and UL for particular cells of the eNB, which transmits the Resource Status Update, e.g., as follows:

TABLE 6

| IE/Group Name | Presence | Range | IE type and reference | Semantics description |
|---|---|---|---|---|
| UL Queue Size | M | | INTEGER (0 . . . FFS) | |
| DL Queue Size | M | | INTEGER (0 . . . FFS) | |

In some demonstrative embodiments, the status request message and the status update message may be communicated as part of dedicated UL/DL queue state X2AP messages.

In some demonstrative embodiments, the status request message may be transmitted from a first node to a second node and may include a dedicated Buffer Status Request message including a Reporting Periodicity IE defining a requested periodicity at which the second node is to update the first node with the UL-DL queue states. The use of the dedicated Buffer Status Request message may enable the first node to request the second node to report the UL-DL states at a different frequency, e.g., a higher frequency, compared, for example, to a frequency at which the second node transmits the Resource Status Update message.

In one example, the Buffer Status Request message may include one or more identifiers of one or more cells, for which the UL-DL queue states are requested, and a requested reporting periodicity at which the UL-DL queue states are to be provided, e.g., as follows:

TABLE 7

| IE/Group Name | Presence | Range | IE type and reference | Semantics description | Criticality | Assigned Criticality |
|---|---|---|---|---|---|---|
| Message Type | M | | | | YES | reject |
| Registration Request | M | | ENUMERATED (start, stop, . . . ) | A value set to "stop", indicates a request to stop all cells measurements. | YES | reject |
| Cell To Report | | 1 | | Cell ID list for which measurement is needed | YES | ignore |
| >Cell To Report Item | | 1 . . . <maxCellineNB> | | | EACH | ignore |
| >>Cell ID | M | | ECGI 9.2.14 | | — | — |
| Reporting Periodicity | O | | ENUMERATED (10 ms, 20 ms, 40 ms, 80 ms, 160 ms, 320 ms, 640 ms, 1000 ms, 2000 ms, 5000 ms, 10000 ms, . . . ) | | YES | ignore |

In some demonstrative embodiments, the status update message may be transmitted from the second node to the first node and may include a dedicated Buffer Status Update message including the UL-DL queue states of the cells identified by the status request message. In one example, the dedicated Buffer Status Update message may be transmitted in response to the dedicated Buffer Status Request message. In another example, the dedicated Buffer Status Update message may be transmitted in response to the Resource Status Request message described above.

In one example, the dedicated Buffer Status Update message may include the UL-DL queue states IE, e.g., as follows:

TABLE 8

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Measurement Result | | 1 | | | YES | ignore |
| >Cell Measurement Result Item | | 1 ... <maxCellineNB> | | | EACH | ignore |
| >>UL-DL Queue Sizes | O | | | | | |

In some demonstrative embodiments, nodes 106 and 108 may communicate a timing message including timing information indicating a timing at which node 106 is allowed to update the TDD UL-DL configuration allocated for cell 102 and/or a timing at which node 108 is allowed to update the TDD UL-DL configuration allocated for cell 104. In one example, the timing update may be synchronized across multiple cells, if desired.

In some demonstrative embodiments, the timing information may be communicated as part of an IE, e.g., a Served Cell Information IE, including cell configuration information of one or more cells.

In one example, a first node, e.g., node 106, may transmit, e.g., to a second node, an eNB Configuration Update message including a Served Cell Information IE, which may include a configuration update Timescale field indicating how often the first node is allowed to update the TDD UL-DL configuration. For example, the Served Cell Information IE may include the configuration update Timescale field, e.g., as follows:

TABLE 9

| IE/Group Name | Presence | Range | IE type and reference | Semantics description | Criticality | Assigned Criticality |
|---|---|---|---|---|---|---|
| PCI | M | | INTEGER (0 ... 503, ... ) | Physical Cell ID | — | — |
| Cell ID | M | | ECGI 9.2.14 | | — | — |
| TAC | M | | OCTET STRING (2) | Tracking Area Code | — | — |
| Broadcast PLMNs | | 1 ... <maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in ref. TS 36.104 [16]. | — | — |
| >>>DL EARFCN | M | | EARFCN 9.2.26 | Corresponds to $N_{DL}$ in ref. TS 36.104 [16]. | — | — |
| >>>UL Transmission Bandwidth | M | | Transmission Bandwidth 9.2 27 | | — | — |
| >>>DL Transmission Bandwidth | M | | Transmission Bandwidth 9.2 27 | Same as UL Transmission Bandwidth in this release. | — | — |
| >TDD | | | | | — | — |
| >>TDD Info | | 1 | | | — | — |
| >>>EARFCN | M | | 9.2.26 | Corresponds to $N_{DL}/N_{UL}$ in ref. TS 36.104 [16]. | — | — |
| >>>Transmission Bandwidth | M | | Transmission Bandwidth 9.2 27 | | — | — |
| >>>Subframe Assignment | M | | ENUMERATED (sa0, sa1, sa2, sa3, sa4, sa5, sa6, ... ) | Uplink-downlink subframe configurationinformation defined in ref. TS 36.211 [10]. | — | — |
| >>>Special Subframe Info | | 1 | | Special subframe configurationinformation defined in ref. TS 36.211 [10]. | — | — |

TABLE 9-continued

| IE/Group Name | Presence | Range | IE type and reference | Semantics description | Criticality | Assigned Criticality |
|---|---|---|---|---|---|---|
| >>>>Special Subframe Patterns | M | | ENUMERATED (ssp0, ssp1, ssp2, ssp3, ssp4, ssp5, ssp6, ssp7, ssp8, . . . ) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| >>>TDD UL-DL Configuration Update Timescale | | | | | | |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9]. | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG Id | O | | 9.2.53 | | YES | ignore |

The TDD UL-DL Configuration Update Timescale IE may be defined, for example, as an integer value, for example, within a predefined range, e.g., between 10 milliseconds (ms) and 640 ms; as an enumerated value for a limited set of values in the range, e.g., 10 ms, 20 ms, 40 ms, 80 ms, 160 ms, 320 ms, and 640 ms, or in any other manner.

In some demonstrative embodiments, the timing information may be configured to all eNBs, e.g., to both nodes 106 and 108, for example, by an OAM.

In some demonstrative embodiments, nodes 106 and 108 may communicate an indication of an UL-DL configuration subset selected by node 106 from a predefined set of UL-DL configurations and/or an indication of an UL-DL configuration subset selected by node 108 from the predefined set of UL-DL configurations.

In some demonstrative embodiments, nodes 106 may be configured to select the TDD UL-DL configuration from a predefined set of seven TDD UL-DL configurations, e.g., as defined by 3GPP TS 36.211.

In some demonstrative embodiments, node 106 may transmit an eNB Configuration Update message including a Served Cell Information IE including a subframe assignment IE indicating one or more allowed UL-DL configurations, which is selected by node 106 to be allowed for use by one or more other nodes, e.g., node 108; and/or node 108 may transmit an eNB Configuration Update message including a Served Cell Information IE including a subframe assignment IE indicating one or more allowed UL-DL configurations, which are selected by node 108 to be allowed for use by one or more other nodes, e.g., node 106. For example, the Served Cell Information IE may include the subframe assignment IE, e.g., as follows:

TABLE 10

| IE/Group Name | Presence | Range | IE type and reference | Semantics description | Criticality | Assigned Criticality |
|---|---|---|---|---|---|---|
| PCI | M | | INTEGER (0 . . . 503, . . . ) | Physical Cell ID | — | — |
| Cell ID | M | | ECGI 9.2.14 | | — | — |
| TAC | M | | OCTET STRING (2) | Tracking Area Code | — | — |
| Broadcast PLMNs | | 1 . . . <maxnoofBPLMNs> | | Broadcast PLMNs | | |
| >PLMN Identity | M | | 9.2.4 | | — | — |
| CHOICE EUTRA-Mode-Info | M | | | | — | — |
| >FDD | | | | | | |
| >>FDD Info | | 1 | | | — | — |
| >>>UL EARFCN | M | | EARFCN 9.2.26 | Corresponds to $N_{UL}$ in ref. TS 36.104 [16]. | — | — |

TABLE 10-continued

| IE/Group Name | Presence | Range | IE type and reference | Semantics description | Criticality | Assigned Criticality |
|---|---|---|---|---|---|---|
| >>>DL EARFCN | M | | EARFCN 9.2.26 | Corresponds to $N_{DL}$ in ref. TS 36.104 [16]. | — | — |
| >>>UL Transmission Bandwidth | M | | Transmission Bandwidth 9.2 27 | | — | — |
| >>>DL Transmission Bandwidth | M | | Transmission Bandwidth 9.2 27 | Same as UL Transmission Bandwidth in this release. | — | — |
| >TDD | | | | | — | — |
| >>TDD Info | | 1 | | | — | — |
| >>>EARFCN | M | | 9.2.26 | Corresponds to $N_{DL}/N_{UL}$ in ref. TS 36.104 [16]. | — | — |
| >>>Transmission Bandwidth | M | | Transmission Bandwidth 9.2 27 | | — | — |
| >>>Subframe Assignment | M | | ENUMERATED (sa0, sa1, sa2, sa3, sa4, sa5, sa6, . . . ) | Uplink-downlink subframe configurationinformation defined in ref. TS 36.211 [10]. | — | — |
| >>>Special Subframe Info | | 1 | | Special subframe configurationinformation defined in ref. TS 36.211 [10]. | — | — |
| >>>>Special Subframe Patterns | M | | ENUMERATED (ssp0, ssp1, ssp2, ssp3, ssp4, ssp5, ssp6, ssp7, ssp8, . . . ) | | — | — |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| >>>Subframe Assignment Subset | | | | | | |
| Number of Antenna Ports | O | | 9.2.43 | | YES | ignore |
| PRACH Configuration | O | | PRACH Configuration 9.2.50 | | YES | ignore |
| MBSFN Subframe Info | | 0 . . . <maxnoofMBSFN> | | MBSFN subframe defined in TS 36.331 [9]. | GLOBAL | ignore |
| >Radioframe Allocation Period | M | | ENUMERATED(n1, n2, n4, n8, n16, n32, . . . ) | | — | — |
| >Radioframe Allocation Offset | M | | INTEGER (0 . . . 7, . . . ) | | — | — |
| >Subframe Allocation | M | | 9.2.51 | | — | — |
| CSG Id | O | | 9.2.53 | | YES | ignore |

In some demonstrative embodiments, the Subframe Assignment Subset IE may indicate, for example, which one or more subsets out of the seven TDD UL-DL configurations are allowed, by a node transmitting the Served Cell Information IE, to be used by one or more other nodes. In one example, the Subframe Assignment Subset IE may be defined as a bitmap, in which a bit is set to a predefined value, e.g., one, to indicate that a corresponding TDD UL-DL configuration is allowed to be used by the one or more other nodes. For example, a first bit may be set to "1", while all other bits are set to zero, to indicate that a first TDD UL-DL configuration is to allowed to be used by the one or more other nodes.

In one example, node 106 may transmit the Subframe Assignment Subset IE indicating a plurality of TDD UL-DL configurations, which are allowed for use. Node 108 may receive the Subframe Assignment Subset IE from node 106 and may select a TDD UL-DL configuration from the plurality of TDD UL-DL configurations indicated as allowed by the Subframe Assignment Subset IE. Node 108 may transmit a TDD UL-DL configuration update, e.g., as described above, indicating the TDD UL-DL configuration selected by node 108.

In some demonstrative embodiments, the TDD UL-DL may be configured to a selected configuration for all eNB s, e.g., both nodes 106 and 108, for example, by an OAM.

In some demonstrative embodiments, a particular node may communicate to another node a message including an indication ("spectral efficiency indication") of an average UL-DL spectral efficiency for one or more cells controlled by the particular node. For example, nodes 106 and 108 may communicate an indication of an average UL-DL spectral efficiency for cells 102 and/or 104.

In some demonstrative embodiments, the X2AP resource status reporting procedure may be utilized to support communication of the spectral efficiency indication, e.g., as described below.

In some demonstrative embodiments, a first node may transmit to a second node a request message including a request for the indication of the average UL-DL spectral efficiency, and defining a requested periodicity at which the indication of the average UL-DL spectral efficiency is to be transmitted.

In some demonstrative embodiments, the RESOURCE STATUS REQUEST may be transmitted by the first node to request the second node to communicate the spectral efficiency indication. For example, an IE of the RESOURCE STATUS REQUEST, e.g., a Report Characteristics IE, may include a bit ("UL-DL spectral efficiency periodic") to indicate the request for the spectral efficiency indication. In one example, the Report Characteristics IE of the RESOURCE STATUS REQUEST of Table 4 may be modified to include an additional bit, e.g., a seventh bit, to indicate the request for the spectral efficiency indication. The Reporting Periodicity IE may also be included, e.g., as described above with reference to Table 4. Alternatively the Buffer Status Request message, as described above with reference to Table 7, may be used.

In some demonstrative embodiments, the second node may transmit a RESOURCE STATUS UPDATE message including average UL and DL spectral efficiency information, e.g., if the "UL-DL spectral efficiency periodic" bit is set to a predefined value, e.g., one.

In one example, the RESOURCE STATUS UPDATE message may include an UL-DL Spectral Efficiency IE, e.g., as follows:

The UL-DL Spectral Efficiency IE may include an indication of the average UL and DL spectral efficiency. In one example, the UL-DL Spectral Efficiency IE may be defined as an integer value, e.g., in terms of (bit/s)/Hz. In another example, the UL-DL Spectral Efficiency IE may be defined as an enumerated value.

Figure 3:
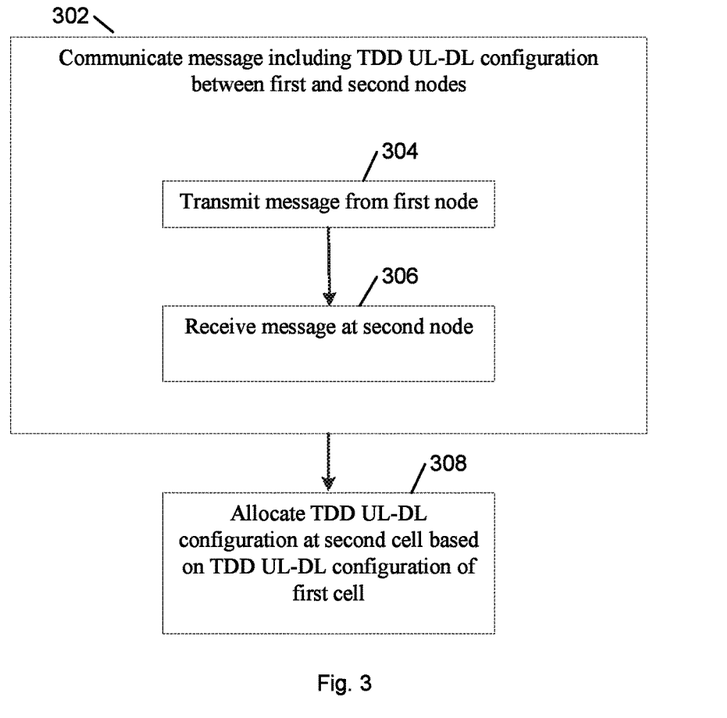
FIG. 3 is a schematic flow-chart illustration of a method of Time-Division-Duplex (TDD) Uplink-Downlink (UL-DL) configuration management, in accordance with some demonstrative embodiments.

Reference is made to FIG. 3, which schematically illustrates a method of TDD UL-DL configuration management, in accordance with some demonstrative embodiments. In some embodiments, one or more of the operations of the method of FIG. 3 may be performed by a cellular system e.g., system 100 (FIG. 1); and/or cellular node, e.g., nodes 106 and/or 108 (FIG. 1).

As indicated at block 302, the method may include communicating a message between a first cellular node and at least one second cellular node, the message including an indication of a TDD UL-DL configuration allocated by the first node for communication within at least one first cell controlled by the first node. For example, nodes 106 and 108 (FIG. 1) may communicate an X2-AP message including a cell identifier identifying cell 102 (FIG. 1) and an indication of a TDD UL-DL configuration allocated by node 106 for communication within cell 102.

As indicated at block 304, communicating the message may include transmitting the message by the first node. For example, node 106 (FIG. 1) may transmit the message including the indication of the TDD UL-DL configuration allocated by node 106 for communication within cell 102.

As indicated at block 306, communicating the message may include receiving the message at the second node. For example, node 108 (FIG. 1) may receive the message including the indication of the TDD UL-DL configuration allocated by node 106 for communication within cell 102.

As indicated at block 308, the method may include allocating a TDD UL-DL configuration for communication within a second cell based on the TDD UL-DL configuration updated by the first node. For example, node 108 (FIG. 1) may update a TDD UL-DL configuration allocated for cell 104 (FIG. 1) based on the TDD UL-DL configuration allocated for cell 102 (FIG. 1), as received from node 106 (FIG. 1).

TABLE 11

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ... ) | Allocated by $eNB_1$ | YES | reject |
| eNB2 Measurement ID | M | | INTEGER (1 ... 4095, ... ) | Allocated by $eNB_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >>UL-DL Spectral Efficiency | | | | | | |

Figure 4:
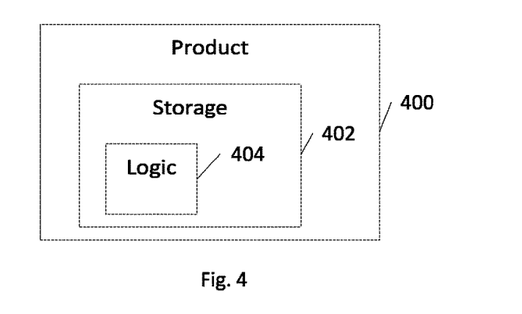
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of nodes 106 and/or 108 (FIG. 1), TDD UL/DL controller 230 (FIG. 2), wireless communication unit 202 (FIG. 2), and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. At least one non-transitory computer-readable storage medium comprising instructions that, when executed, cause a system to:

control communication of a message to share load information in an orthogonal frequency-division multiplexing (OFDM) time-division-duplexing (TDD) long term evolution (LTE) or LTE advanced (LTE-A) cellular system, the message having a first information element (IE) to indicate a cell identifier for a first wireless communication cell, a second IE to indicate uplink-downlink (UL-DL) configuration information intended to be used by the first wireless communication cell, and a third IE to indicate a cell identifier for a second wireless communication cell; and send the message over a communication channel.

2. The non-transitory computer-readable storage medium of claim 1, the message comprising an X2 application protocol (X2AP) message.

3. The non-transitory computer-readable storage medium of claim 1, the message comprising a load information message of an X2 application protocol (X2AP).

4. The non-transitory computer-readable storage medium of claim 1, the first IE comprising a cell identifier IE of a cell information item IE group.

5. The non-transitory computer-readable storage medium of claim 1, the second IE comprising a dynamic subframe assignment IE of a cell information item IE group, the dynamic subframe assignment IE to indicate the UL-DL configuration information as a value within a set of enumerated values, the value to indicate a predefined UL-DL configuration.

6. The non-transitory computer-readable storage medium of claim 1, the second IE comprising an UL-DL configuration update IE of a cell information item IE group, the UL-DL configuration update IE to indicate the UL-DL configuration information as a value within a set of enumerated values, each enumerated value to indicate a different predefined UL-DL configuration.

7. The non-transitory computer-readable storage medium of claim 1, the third IE comprising a target cell identifier IE of an UL high interference information IE group.

8. The non-transitory computer-readable storage medium of claim 1, comprising instructions that when executed cause the system to send the message to an eNB that controls the second wireless communication cell.

9. A method, comprising:

receiving a message to share load information in an orthogonal frequency-division multiplexing (OFDM) time-division-duplexing (TDD) cellular system, the message having a first information element (IE) to indicate a cell identifier for a first wireless communication cell, a second IE to indicate uplink-downlink (UL-DL) configuration information intended to be used by the first wireless communication cell, and a third IE to indicate a cell identifier for a second wireless communication cell; and allocating an UL-DL configuration for the second wireless communication cell based at least in part on the UL-DL configuration information intended to be used by the first wireless communication cell.

10. The method of claim 9, the OFDM TDD cellular system comprising a long term evolution (LTE) or LTE advanced (LTE-A) system.

11. The method of claim 9, the message comprising an X2 application protocol (X2AP) message.

12. The method of claim 9, the message comprising a load information message of an X2 application protocol (X2AP).

13. The method of claim 9, the first IE comprising a cell identifier IE of a cell information item IE group.

14. The method of claim 9, the second IE comprising a dynamic subframe assignment IE of a cell information item IE group, the dynamic subframe assignment IE to indicate the UL-DL configuration information as a value within a set of enumerated values, the value to indicate a predefined UL-DL configuration.

15. The method of claim 9, the second IE comprising an UL-DL configuration update IE of a cell information item IE group, the UL-DL configuration update IE to indicate the UL-DL configuration information as a value within a set of enumerated values, each enumerated value to indicate a different predefined UL-DL configuration.

16. The method of claim 9, the third IE comprising a target cell identifier IE of an UL high interference information IE group.

17. The method of claim 9, comprising receiving the message from an eNB that controls the first wireless communication cell.

18. A method, comprising:
controlling transmission of a load information message of an X2 application protocol (X2AP) over an orthogonal frequency-division multiplexing (OFDM) time-division-duplexing (TDD) cellular system, the load information message having a cell identifier information element (IE) to indicate a cell identifier for a wireless communication cell, and an uplink-downlink (UL-DL) configuration update IE to indicate UL-DL configuration information intended to be used by the wireless communication cell indicated by the cell identifier; and
sending the load information message over a communication channel.

19. The method of claim 18, the cell identifier IE comprising part of a cell information item IE group.

20. The method of claim 18, the UL-DL configuration update IE comprising part of a cell information item IE group, the UL-DL configuration update IE to indicate the UL-DL configuration information as a value within a set of enumerated values, each enumerated value to indicate a defined UL-DL configuration.

21. The method of claim 18, the load information message having a target cell identifier IE to indicate a different wireless communication cell, the target cell identifier IE comprising part of an UL high interference information IE group.

22. The method of claim 18, the OFDM TDD cellular system comprising a long term evolution (LTE) or LTE advanced (LTE-A) system.

23. At least one non-transitory computer-readable storage medium comprising instructions that, when executed, cause a system to:
generate a message to share load information in an orthogonal frequency-division multiplexing (OFDM) time-division-duplexing (TDD) cellular system, the message having a first information element (IE) to indicate a cell identifier for a first wireless communication cell, a second IE to indicate uplink-downlink (UL-DL) configuration information intended to be used by the first wireless communication cell, and a third IE to indicate a cell identifier for a second wireless communication cell; and
send the load information message over a communication channel.

24. The non-transitory computer-readable storage medium of claim 23, comprising instructions that when executed cause the system to send the load information message as OFDM signals.

25. The non-transitory computer-readable storage medium of claim 23, comprising instructions that when executed cause the system to send the load information message over a data network.

26. The non-transitory computer-readable storage medium of claim 23, the cell identifier IE comprising part of a cell information item IE group, and the UL-DL configuration update IE comprising part of a cell information item IE group, the UL-DL configuration update IE to indicate the UL-DL configuration information as a value within a set of enumerated values, each enumerated value to indicate a defined UL-DL configuration.

27. The non-transitory computer-readable storage medium of claim 23, the load information message having a target cell identifier IE to indicate a different wireless communication cell, the target cell identifier IE comprising part of an UL high interference information IE group.

* * * * *